INVENTORS
HELMUTH FRENK
BY JERRY RZEZNIK

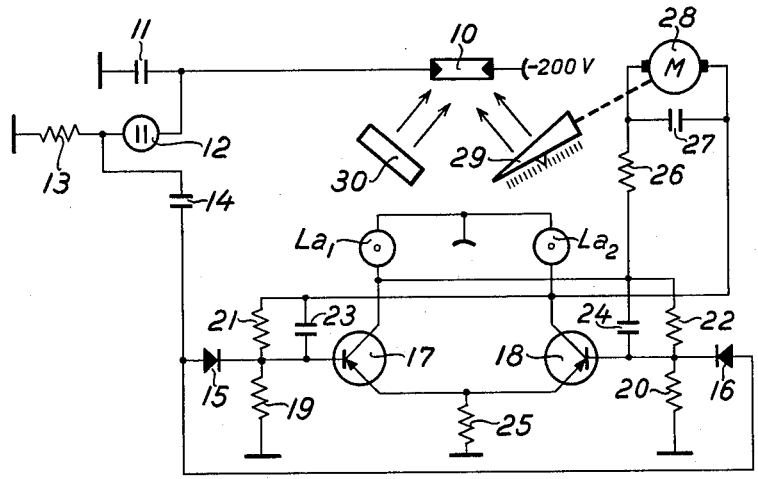
Fig. 1
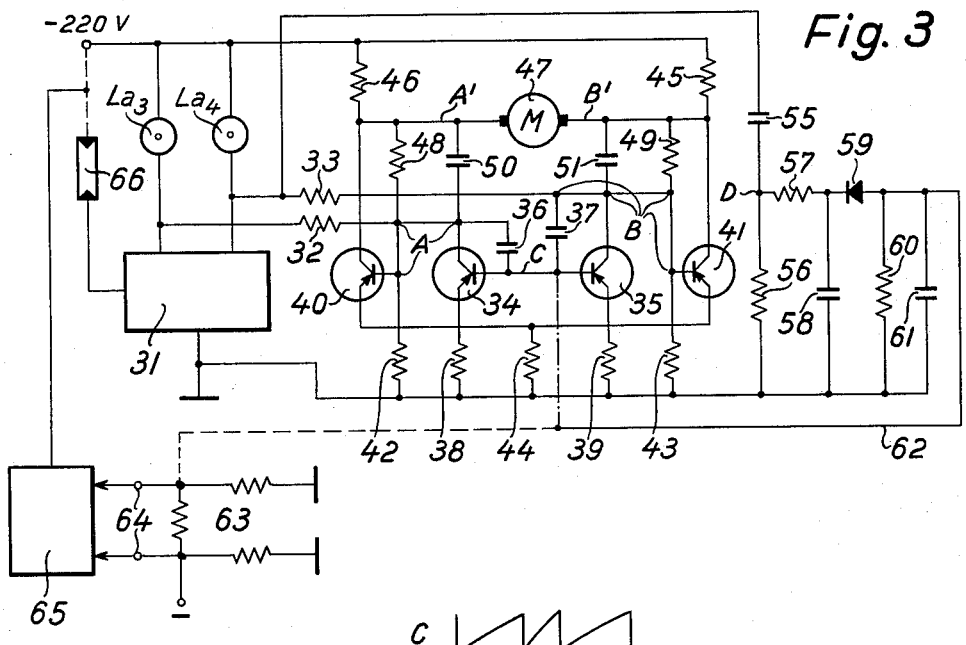
Fig. 3
Fig. 2
INVENTORS
HELMUTH FRENK
JERRY RZEZNIK
BY Toulmin & Toulmin
Attorneys

Toulmin & Toulmin
Attorneys

United States Patent Office 3,255,355
Patented June 7, 1966

3,255,355
AUTOMATIC TWO BEAM PHOTOELECTRIC
RADIATION COMPARISON APPARATUS
Helmuth Frenk, Wetzlar (Lahn), and Jerry Rzeznik,
Heuchelheim, Germany, assignors to Ernst Leitz
G.m.b.H., Wetzlar (Lahn), Germany
Filed Mar. 22, 1963, Ser. No. 267,224
Claims priority, application Germany, Apr. 12, 1962,
L 41,731
12 Claims. (Cl. 250—204)

The present invention relates to a photoelectrically operated radiation comparison apparatus wherein two radiation beams such as light beams are balanced; one beam is influenced by an object of usually unknown translucency while the other beam is correspondingly influenced by an object of variable but known translucency.

It is a primary object of the present invention to provide a new and improved fully automatic two beam photoelectric radiation comparison apparatus of the type described, using photo resistors of high sensitivity.

It is known that photosensitive resistors have a non-linear light intensity-resistivity characteristic, which also is dependent upon temperature. Known photoelectrically operated light beam comparison devices already use such resistors as light sensitive elements, and the aforementioned nonlinearily as well as the temperature dependency do not influence the balancing of the two light beams provided such balancing is carried out only by optical means so that indication is had by zeroing-in the instrument. A quantitative evaluation, however, requires a phase sensitive rectification of a sensed unbalanced or error signal. Such phase sensitive rectification is difficult to master since different light intensity levels result in a phase shifting. To eliminate this disturbing effect one could weaken the comparison light beam by a constant amount, while the measuring ray beam is being weakened down to the level of sensitivity, i.e. about 1% from normal. The disadvantage of this method is that all measuring is being carried out at the lowest level, which is detrimental to the accuracy. One could also select a very high frequency so that even in case of a large time constant there would still be an approximately 90° phase shift. This, in turn, results in a loss of amplitude which, of course, is also detrimental to the accuracy of measurement.

It is, therefore, another object of the invention to provide a new and improved photoelectric comparison device which is free from the aforementioned deficiencies.

According to one aspect of the present invention, in a preferred embodiment thereof, the following apparatus is suggested.

There are first provided means for alternatingly producing two radiation beams, for example, light beams. An electronic flip-flop control comprising for example, two lamps alternatingly turned on and off, or a diaphragm or mirror are electronically controlled to form two alternating radiation or light beams having common origin. The two light beams are individually influenced, one by a specimen of unknown translucency, and the other by an element of variable but known translucency, such as a transversely slidable gray wedge, properly calibrated. The two light beams preferably are combined to respectively control the resistivity of a photoresistor which is connected in series with an electric integrator such as a capacitor. Means are provided to discharge the capacitor whenever its charge has reached a predetermined level. The discharge current is used to produce a trigger pulse switching the flip-flop so as to turn on the other beam.

It is thus apparent, that there is produced a train of trigger pulses and the time interval between two pulses determines the time during which a beam is on which was turned on by the leading one of these two pulses. Furthermore, two succeeding time intervals will be of equal duration if the two beams which act upon the photoresistor are of equal intensity. Any unbalance in the light beams results in a different duration of two succeeding time intervals. This difference is utilized in a feedback loop to adjust the aforementioned gray wedge so as to rebalance the beams.

The sensitivity of the entire apparatus can be controlled by feedback action, using the pulse train frequency. The voltage produced being dependent on such frequency, it can be used either to keep the frequency at a constant level or to adjust the sensitivity of the gray-wedge-adjusting element to avoid idling during low frequencies.

It will be appreciated that the invention is not limited to the employment of visible light as the radiation, but infrared ultraviolet X-rays, gamma rays and even particle rays can be used, whereby the only requirements are that the beams must be distinguishable and capable of being turned on and off by an electronic switching device, and that the electric current or voltage output be a uniform and preferably linear function of the radiation input.

Further objects and features of this invention will be better understood from the following detailed description with reference to the accompanying drawings wherein:

FIGURE 1 is a schematic circuit diagram of one form of this invention;

FIGURE 2 shows graphically the voltage at the integrating capacitor in relation to the time and to the on and off states of the lamps;

FIGURE 3 shows a modification of FIGURE 1 with an automatic control; and

Figure 4:
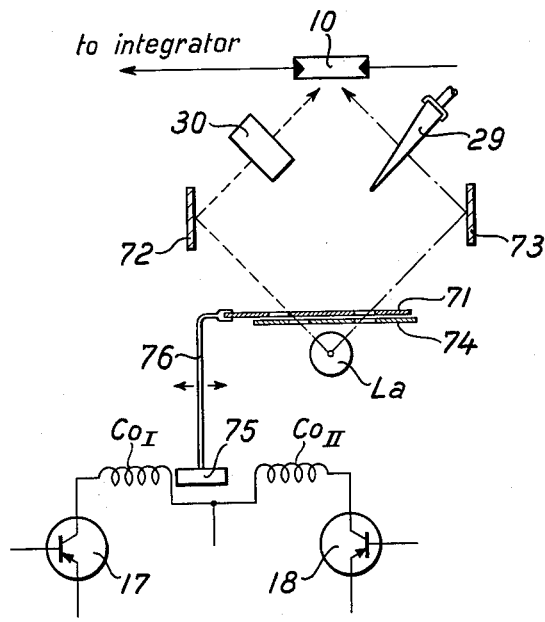
FIGURES 4 and 5 are further modifications of FIGURE 1.

Proceeding now to the detailed description of the drawings, in FIGURE 1 thereof are shown two lamps $La_1$ and $La_2$ defining individual origins of two light paths and beams. There is provided a single photosensitive element such as a photoresistor or diode 10 connected with one of its terminals to a source of voltage potential of about 200 volts (negative relative to ground) while the other terminal of photoresistor 10 is connected in series with an integrating capacitor 11 which in turn is connected to ground. A series circuit connection comprised of a glow discharge tube 12 and a resistor is connected across capacitor 11 governing the maximum charge permissible to accumulate in capacitor 11.

The junction of tube 12 and resistor 13 is tapped and a bleeder line runs via a coupling capacitor to two diodes 15 and 16, which in turn are connected to the base electrodes of transistors 17 and 18, respectively. The two transistors constitute a bistable multivibrator or flip-flop of known circuit connection with the exception, that the aforementioned $La_1$ and $La_2$ constitute the collector resistors of the flip-flop. There may, of course, be inserted further collector resistors for balancing the network.

The trigger pulses for the flip-flop are derived through and from capacitor 14. Briefly, the emitter electrodes of the two transistors 17 and 18 are interconnected directly and their junction is grounded through a common biasing resistor 25. The base electrodes of transistors 17 and 18 are individually grounded through biasing resistors 19 and 20, respectively.

The base electrode of transistor 17 is further connected to the collector electrode of transistor 18 through a parallel circuit connection comprised of a resistor 21 and a capacitor 23, while the base electrode of transistor 18 is connected to the collector electrode of transistor 17 through a parallel circuit connection comprised of a resistor 22 and a capacitor 24.

The coupling and biasing elements 19 through 25 (subject to load elements in the collector circuit) interconnect the two transistors 17 and 18 so as to constitute a bistable multivibrator or flip-flop whereby always only one transistor is conductive and the respective conductive one feeds current to the lamp in its collector circuit. Thus, either lamp $La_1$ or $La_2$ is lighting, but always while the other one is turned off.

The collector circuits of the two transistors further include the armature of an electric D.C. motor 28 with shunted capacitor 27 and series resistor 26. This circuit connection is connected across the two aforementioned collector electrodes and thus is supplied with current resulting from the difference in potential between these two collector electrodes. In other words, the aforedescribed flip-flop applies alternately D.C. voltage pulses of opposite polarity but similar amplitude to motor 28. The field (not shown) of this motor may be provided for in a conventional manner as constant excitation.

The motor 28, particularly the driving shaft thereof is geared to a gray wedge 29, for example, by means of a conventional rack and pinion arrangement (schematically indicated by dashed line) to laterally shift gray wedge 29 in a direction transversely to the light path defined between lamp $La_2$ and photoresistor 10. An object or specimen 30 of usually unknown translucency is disposed in the light path defined between lamp $La_1$ and photoresistor 10.

For reasons of simplicity, specimen 30 is shown as solid block, but it is understood that it can be a container for an unknown gas or liquid, the translucency of which is to be determined. Specimen 30 may even be a substance of uncertain nature.

The device as described thus far operates as follows: Starting out from any operative position it may be assumed that transistor 17 is conductive so that lamp $La_1$ is on while transistor 18 is nonconductive so that lamp $La_2$ is off.

Radiation thus reaches photoresistor 10 through object 30 and a particular illumination, i.e., light the intensity of which is peculiarly modified by specimen 30 sets the resistivity of resistor 10 to permit a particular charging current to flow to capacitor 11. Capacitor 11 thus integrates a current which is indicative of the light intensity of one beam.

At a particular voltage, i.e. of the charge across capacitor 11, glow discharge tube 12 will fire, and a discharge current is forced therethrough causing a voltage drop across resistor 13 which constitutes a first trigger pulse for the transistor flip-flop. Transistor 18 is rendered conductive thereby while transistor 17 is rendered nonconductive by conventional flip-flop operation so that lamp $La_1$ is turned off while lamp $La_2$ is turned on, and further illumination of resistor 10 is had from lamp $La_2$, i.e., the second beam influenced by gray wedge 21.

The triggering of the flip-flop was initiated by a discharge of capacitor 11 through tube 12. The discharge current will continue to flow until the voltage across tube 12 is reduced below the arc voltage and the flow discharge tube extinguishes, thus interrupting the capacitor discharge connection to resistor 13. Preferably, discharge resistor 13 is low ohmic as compared with that of the integrating circuit, so that capacitor 11 is being discharged very rapidly.

Upon discharge the capacitor 11 can be recharged again through photoresistor 10 until the voltage across capacitor 11 is sufficient to again fire the tube 12. The resistivity of resistor 10 is now determined by the second beam from lamp $La_2$.

Assuming that the illumination of photoresistor 10 remains the same regardless which one of the two lamps is on, then the time required to recharge capacitor 11 will also remain the same. Thus, there will be produced a train of equidistantly spaced trigger pulses for the flip-flop which accordingly will oscillate at the frequency determined by the rate of the trigger pulses. The durations of the several half waves of such oscillation will then also remain constant.

The frequency of the train of trigger pulses is selected so that each individual half wave of the flip-flop oscillator is insufficient to cause motor 28 to rotate. Since, in fact, an alternating voltage is being supplied to motor 28 it will only vibrate slightly without rotating. Hence, gray wedge 29 will remain in the same position, thus indicating that the particular known translucency of the wedge portion governing the light path $La_2$–10 matches the hitherto unknown translucency of the object 30, assuming of course that lamps $La_1$ and $La_2$ are of equal brightness. If not, calibration to obtain such equality is both required and possible.

It will now be assumed that at a particular position of gray wedge 29 the illumination from lamp $La_2$ is modified so as to affect resistor 10 differently as compared with the modification produced by object or specimen 30 in light path $La_1$–10. Of course, as compared with the previously described operative position, it could also be assumed with similar result that object 30 has been exchanged for one of different translucency. At any rate, it will be assumed that the light reaching resistor 10 from lamp $La_1$ through object 30 is weaker than the light reaching resistor 10 from lamp $La_1$ through gray wedge 29.

Accordingly, the charging current for capacitor 11 will be lower when lamp $La_1$ is turned on and therefore this lamp $La_1$ will remain on longer as compared with lamp $La_2$. The flip-flop trigger pulses are thus not equidistantly spaced any more so that the period of time during which the potential of the collector electrode of transistor 18 is positive relative to the collector potential of transistor 17 is larger than the period of time in which the voltage potential relationship is the opposite one thereof. Hence, a D.C. component is now supplied to motor 28 which starts to run accordingly, i.e., the specific polarity of the resulting D.C. component determines the direction of rotation and thus the direction of movement of gray wedge 29. The resistor-capacitor arrangement 26, 27 can suitably serve as filter to smooth out this D.C. component.

Motor 28 will run in such a direction so that gray wedge is being shifted until the illumination for resistor 10 is balanced again and the trigger pulses for the flip-flop come again equidistantly spaced. The new position of the gray wedge 29 is again indicative of the translucency of object-specimen 30. A suitable scale or index can be provided at the wedge for quantitatively evaluating the measurement thus obtained.

In FIGURE 2 are shown three diagrams plotted against time. The top diagram shows the voltage across capacitor 11, and one can see, that, in fact, resistor 13 is being proportioned to permit a very rapid discharge. Each steep flank produces a high flip-flop trigger pulse, and the two lower diagrams in FIGURE 2 illustrate the on and off states of lamps $La_1$ and $La_2$ which, of course, is also indicative of the states of conduction of the transistors 17 and 18.

At this particular situation, the gray wedge 29 will be shifted so as to further weaken the light from lamp $La_2$ which in turn will lengthen the time in which lamp $La_2$ remains on. The period of time during which lamp $La_1$ is on is determined by the translucency of the object-specimen 30, and varies accordingly, but remains constant during measurement as long as the particular object-specimen 30 remains in position.

It will be appreciated that even in case of a very low light intensity (as from an almost opaque specimen and wedge portion) one still does not require an amplifier for the measuring current, since the the actuating voltage of the D.C. pulses applied to the motor 28 depends on the operating voltage of the flip-flop alone and not on the measuring result. The effective D.C. voltage applied to the motor of course depends proportionately on the difference of intensity of the two light beams but not on the absolute value of either intensity. In other words if for example the intensity of one beam is 10% higher than the other, the D.C. operating voltage for motor 28 will be proportionately higher, regardless of the absolute value of either intensity. The flip-flop operating voltage can be selected sufficiently high so that a low power motor can respond to even the small D.C. voltages indicative of small beam unbalances.

The single flip-flop stage employed is being used twice—once in the lamp circuit, for closing the feedback loop which determines the flip-flop frequency, and then used in a second feedback loop for controlling the adjusting motor 28. This double use requires that the motor consume considerable less power than the lamps do, since a running of the motor must not reduce the current applied to the lamps to such an extent that the luminosity is being varied thereby. Actually, if both lamps become dimmer simultaneously no change in balance or in degree of any existing unbalance would be observed, but a change in intensity of both light beams as a time-dependent process results in a change in frequency, and since during control action one half wave is being modified, a concurrent frequency change might be detrimental to the accuracy and undesired instability oscillations could be set up.

The voltage source employed can be quite weak and of small size. The operating voltage is preferably about 200 volts as stated.

In case a somewhat stronger control motor is required, one will preferably use transistor trigger stages interposed between flip-flop and motor, so as to control the motor in response to control signals derived from the flip-flop.

In the aforedescribed embodiment, there is actually a proportional relationship between flip-flop frequency and brightness as determined by object-specimen 30 as well as by gray wedge 29 after balancing has been achieved. In case one wants to measure up to 1% light absorbtion, the frequency can thus vary in a range from 1:100. However, when the frequency is too low the motor 28 will not merely vibrate, but it may start to run in reverse etc., which unbalances the entire circuit. Conversely, there is an upper frequency limit beyond which there is no longer any true alternating between the two light paths.

In FIGURE 3 there is illustrated an embodiment, in which an automatic control remedies this situation. Proceeding now to the description of a first remedy the specific objective contemplated is the control of the filter time constant effective at the motor.

In FIGURE 3 the block 31 will be called briefly flip-flop but it is to include all of the elements 10 to 25 of FIGURE 1, i.e., the flip-flop proper, and the feedback circuit comprising the photoresistor and the capacitor-resistor assembly coupling the photoresistor to the flip-flop. The lamps are here designated with $La_3$ and $La_4$ and their circuit connections with the flip-flop as well as their spacial relation to the photosensitive resistor 60 correspond to those of FIGURE 1.

The collector electrodes of the two transistors constituting the flip-flop, or what means the same, the lamps $La_3$ and $La_4$ are respectively connected to the collector electrodes of two transistors 34 and 35 through resistors 32 and 33, respectively. The two base electrodes of these transistors 34 and 35 are directly interconnected forming a common junction C which is individually connected through capacitors 36 and 37 to the collector electrodes of transistors 34 and 35. The emitter electrodes of these two transistors are individually connected to a base or ground through resistors 38 and 39, respectively.

There are two additional transistors 40 and 41 having their base electrodes connected to the collector electrodes of transistors 34 and 35, respectively. The base electrodes of transistors 40 and 41 and thus the collector electrodes of transistors 34 and 35 are connected to a base through resistors 42 and 43, respectively. Accordingly, resistors 32 and 42, base of transistor 40, collector of transistor 34, capacitor 36 form a common junction A, while resistors 33 and 43, base of transistor 41, collector of transistor 35 and capacitor 37 form a common junction B.

The emitter electrodes of transistors 40 and 41 are directly interconnected and the junction thus formed is connected to ground through a common biasing resistor 14. The collector electrodes of transistors 40 and 41 are individually connected to the minus pole of a suitable D.C. voltage supply source through resistors 46 and 45, respectively. Furthermore, these collector electrodes are interconnected by a D.C. motor 47 at terminals A' and B' thereof. Again, only the armature of this motor is being shown, and the field may be provided in a conventional manner.

The base-collector junction A of transistors 40–34 is connected to the left hand terminal of motor 47 through a parallel feedback circuit comprising a resistor 48 and a capacitor 50. The analogous base-collector electrodes connecting junction B to transistors 41–35, are connected to the right-hand terminal of motor 47 through a parallel feedback circuit comprising a resistor 49 and a capacitor 51.

The junction of lamp $La_4$ and resistor 33, which is one output terminal of flip-flop 31, is connected to a voltage divider composed of a capacitor 55 and a series resistor 56 connected to the base. The junction of capacitor 55 and resistor 56 is designated with reference character D. Since the operating voltage level is constant, the voltage drop distribution across capacitor 55 and resistor 56 is strictly and monotonously frequency dependent.

At junction D there is first connected a resistor 57 with series capacitor 58 which two elements are shunted across resistor 56. Elements 57 and 58 operate as an integrating circuit for the voltage pulses applied as a frequency-dependent pulsating D.C. voltage at junction D.

A rectifier diode 59 is connected with its cathode to the junction resistor 57 and capacitor 58, so that the voltage effective at the said cathode is the integrated voltage level. The anode of diode 59 is connected to a line 62, but there is a filter network connected between line 62 and the base, which filter network comprises a resistor 60 and a capacitor 61. This filter removes the D.C. integrated voltage without differentiating the rectified pulses regardless of how low the pulse frequency is. Hence, the D.C. voltage at line 62 is inversely proportional to the pulse and flip-flop frequency.

At zero frequency the junction of capacitor 55 and of resistor 56 is at mass potential regardless of which lamp is on. At a very high frequency the junction of resistor 56 and capacitor 55 alternates between zero and the full supply voltage. At in-between frequencies the A.C. amplitude of this junction depends on the flip-flop frequency as a monotonous function thereof.

The rectifier-filter network 57, 58, 59, 60, 61 produces a frequency-dependent control voltage which can be fed as base bias to transistors 34 and 35 through line 62.

The device of FIGURE 3 as described thus far operates as follows: The A.C. voltage at flip-flop 31 is produced as was outlined above with reference to FIGURES 1 and 2. Thus, there are alternatingly applied rectangularly shaped D.C. pulses of similar amplitude to junctions A and B, respectively controlling the base electrodes of transistors 40 and 41. Since these transistors function as switching transistor amplifiers, motor terminals A' and B' receive alternatingly positive voltage pulses similarly as was described above with reference to motor 28 of FIGURE 1.

Transistors 34 and 35 with capacitors 36 and 37, respectively, operate as impedance modifiers for transistors 40 and 41, respectively, so that the D.C. voltage pulses at junctions A and B are actually not rectangularly shaped but with a relatively slightly upwardly sloping leading edge (and a correspondingly sloping trailing edge). The effective impedance of the elements 34–36 and 35–37 is controlled by the voltage applied to junction C. The effective control voltage measured between junction C and the base is inversely proportional to the flip-flop frequency.

At a high flip-flop frequency, the alternatingly produced pulses derived from flip-flop 31 do not require any modification, since every individual pulse is insufficient to start motor 47. The motor control circuit is thus to remain predominantly ohmic since no wattless impedance for causing a slope is necessary.

At a high frequency the voltage at line 62 is small so that junction C is kept close to base potential, and transistors 34 and 35 are therefore separated by high ohmic decoupling capacitors 36 and 37 from the control circuit for the motor 47.

At a low frequency a large (negative) D.C. voltage is being applied to junction C, and the transistors being low ohmic, effectively couple capacitors 36 and 37 into the motor control circuit which results in a slow sloping of the pulses at A and B which in turn reduces the amplitude of the pulses alternatingly effective at terminals A′ and B′. Hence, the motor 47 will not be started in spite of the relatively long duration of pulses applied when the flip-flop oscillates at a low frequency.

In case of a low frequency the several feedback loops is stabilized by the feedback resistors 48, feeding back to junction A and particularly to the base electrode of transistor 40, a signal proportional to the motor speed. Capacitor 50 feeds back a signal which is proportional to the motor acceleration. The feedback is a positive one. Resistor 49 and capacitor 51 are correspondingly similar and equivalent feedback elements for the base electrode of transistor 41 at junction B.

For an alternative mode of operation, the elements 34, 35, 36, 37, 38 and 39 can be eliminated. Accordingly, the voltage of line 62 (dashed line) is being fed to a network 63, in which this voltage is compared with a constant voltage to produce an error-signal at terminals 64. An amplifier 65 is connected to terminals 64, which amplifier governs the voltage applied to the photoresistor 66 in such a manner, that the supply voltage increases with decreasing frequency, and the supply voltage decreases with increasing frequency.

Since these controlled voltages affect the photoelectric current, there is constant or approximately constant flip-flop frequency regardless of the light intensity effective at the photoresistor. The flip-flop frequency itself has no bearing on the accuracy of measurement. The frequency regulation thus does not need to be too accurate. In effect its only purpose is to prevent too low a frequency to be applied to motor 47.

In FIGURE 4 it is illustrated how the invention can be modified so that a permanently shining lamp La can be used. In particular it can be derived from this figure that production of alternating light beams within the meaning of the invention is not limited to the turning on and off of lamps, but in FIGURE 4 is shown a stationary diaphragm 74 having two slots or holes to basically define two light beams originating in lamp La, while a twin-slot movable diaphragm alternatingly opens and closes one of the apertures of diaphragm 74. The respective light beams are deflected by mirrors 72 and 73, respectively towards object 30 and gray wedge 79, respectively and toward the common photoresistor 10 which is similar to the photoresistors 10 and 66 in FIGURES 1 and 3 respectively.

Movable diaphragm 71 is linked by means of an arm 76 to armature 75 which is attracted either by a coil $Co_1$ or by a coil $Co_2$. These coils $Co_1$ and $Co_2$ are connected to the flip-flop, particularly the transistors 17 and 18 thereof in a similar manner as were lamps $La_1$ and $La_2$ in FIGURE 1 (or $La_3$ and $La_4$ in FIGURE 3).

The feedback loop between the transistors 17 and 18 and the photoresistor 10 is closed in a manner illustrated in FIGURE 1.

It will be apparent, that the flip-flop here moves diaphragm 71 back and forth so that alternating light beams are produced, one to pass through object 30, the other one through gray wedge 29. The second feedback loop moving gray wedge 29 can be the same as is illustrated in FIGURE 1 or FIGURE 3.

Figure 5:
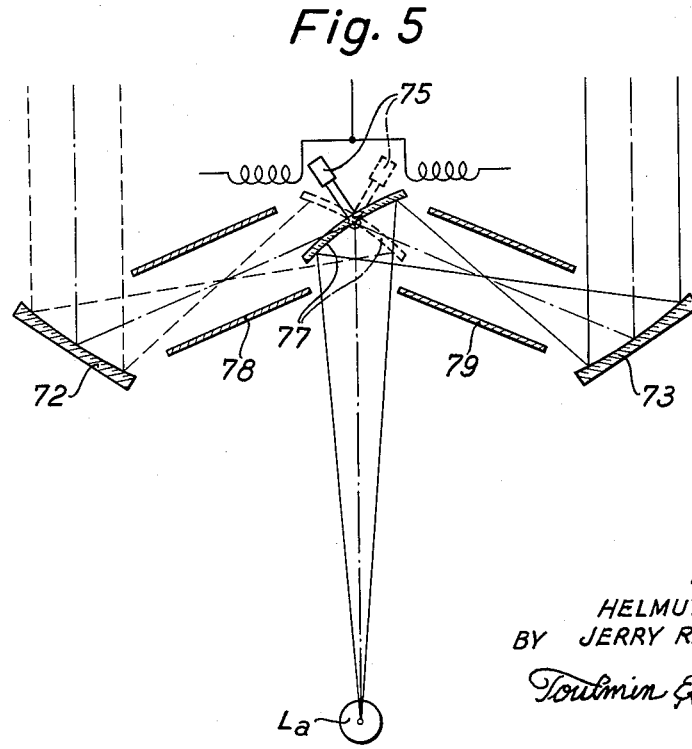

FIGURE 5 briefly shows that in lieu of a movable diaphragm, one can use a concave mirror 77 linked to armature 75 and directing alternatingly light through light ducts 78, 79 to mirrors 72 and 73 so as to define and in effect produce the two alternating light beams. Completion of this apparatus is as aforedescribed.

The photoresistors in the aforedescribed embodiments can be substituted by a photomultiplier or a gas filled envelope with photosensitive electrode which elements can be controlled as to their sensitivity via a control element such as 65.

The invention is not limited to the embodiments described above but all changes and modifications thereof not constituting departures from the spirit and scope of the invention are intended to be covered by the following claims:

What is claimed is:

1. Photoelectric radiation comparison apparatus comprising: means producing alternatingly two radiation beams; photoelectric receiver means responsive to said radiation beams and producing corresponding electric currents; electric means connected to said receiver means for integrating said currents and producing a trigger pulse when a predetermined integrated value has been reached; means for feeding said trigger pulse to said radiation beam producing means for effecting alternation of the latter; and means responsive to any unbalance between two succeeding time intervals as defined between two succeeding trigger pulses, for controlling the radiation intensity of one of said beams as it is effective in said receiver means.

2. Photoelectric radiation comparison apparatus comprising: means producing alternatingly two light beams; photoelectric receiver means responsive to said light beams and producing corresponding electric currents; electric means connected to said receiver means for integrating said currents and producing a trigger pulse when a predetermined integrated value has been reached; means for feeding said trigger pulse to said light beam producing means for effecting alternation of the latter; means for controlling the frequency of the train of said trigger pulses; and means responsive to any unbalance between two succeeding time intervals as defined between two succeeding trigger pulses, for controlling the light intensity of one of said beams as it is effective in said receiver means.

3. Photoelectric radiation comparison apparatus comprising: means producing alternatingly two light beams; photoelectric receiver means response to said light beams and producing corresponding electric currents; electric means connected to said receiver means for integrating said currents and producing a trigger pulse when a predetermined integrated value has been reached; means for feeding said trigger pulse to said light beam producing means for effecting said alternation; means responsive to the frequency of the train of said trigger pulses and controlling the voltage applied to said photoelectric receiver means; and means responsive to any unbalance between two succeeding time intervals as defined between two succeeding trigger pulses, for controlling the light intensity of one of said beams as it is effective in said receiver means.

4. Photoelectric radiation comparison apparatus comprising: means producing alternatingly two light beams; photoelectric receiver means responsive to said light beams and producing corresponding electric currents; electric means connected to said receiver means for integrating said currents and producing a trigger pulse when a predetermined integrated value has been reached; means for feeding said trigger pulse to said light beam producing means for effecting said alternation; means responsive to any unbalance between two succeeding time intervals as defined between two succeeding trigger pulses for controlling the light intensity of one of said beams as it is effective in said receiver means; and means responsive to the frequency of the train of said trigger pulses for reducing the sensitivity of said last mentioned means with decreasing trigger pulse frequency.

5. Photoelectric radiation comparison apparatus comprising: electronic switching means alternatingly producing two light beams; controllable means for influencing the light intensity of at least a portion of one of said light beams; photoelectric receiver means responsive to said light beams and producing electric currents corresponding to the individual intensity of said light beams; an electric integrator connected to said receiver means for integrating said currents; means connected to said integrator responsive to a predetermined integrated value and producing a trigger pulse upon occurrence therefore, and feeding said pulse to said switching means for triggering alternation of beam production; and motor means phase sensitively responsive to any unbalance of two succeeding time intervals, respectively elapsing between two succeeding trigger pulses, for actuating said controllable means.

6. Photoelectric radiation comparison apparatus comprising: electronic switching means alternatingly producing two light beams; controllable means for influencing the light intensity of at least a portion of one of said light beams; photoelectric receiver means responsive to said light beams and producing electric currents corresponding to the individual intensity of said light beams; an electric integrator connected to said receiver means for integrating said currents; means connected to said integrator responsive to a predetermined integrated value and producing a trigger pulse upon occurrence therefore; means for feeding said pulse to said switching means for triggering alternation of beam production; a D.C. motor connected to said switching means for alternating application of oppositely poled current pulses, the duration of each pulse corresponding to the time interval elapsing between two succeeding trigger pulses; and means for reducing the amplitude of said current pulse with decreasing trigger pulse rate frequency.

7. Photoelectric radiation comparison apparatus comprising: an electronic bistable multivibrator alternatingly turning on and off two light beams; an electric D.C. motor connected to said bistable multivibrator so that oppositely poled voltage pulses are being applied thereto with each pulse corresponding to the on-time of one light beam; means drivingly connected to said motor for influencing one of said light beams; photoelectric receiver means responsive to said two light beams; a capacitor connected to said receiver means for integrating the current therein; means for discharging said capacitor after a predetermined charge value has been reached; and means connected for deriving a trigger pulse from said capacitor every time it is being discharged, said trigger pulses being fed to said multivibrator for switching thereof.

8. Comparison apparatus as set forth in claim 7, said multivibrator alternatingly turning on and off two lamps.

9. Comparison apparatus as set forth in claim 7, said multivibrator controlling a diaphragm.

10. Comparison apparatus as set forth in claim 7, said multivibrator controlling a mirror.

11. Photoelectric radiation comparison apparatus comprising: an electronic bistable multivibrator alternatingly turning on and off two light beams; two electronic switching elements individually connected to the two output terminals of said bistable multivibrator; a D.C. motor connected to said two switching elements so that oppositely poled voltages are being applied therefrom to said motor; controllable impedance means connected to said two switching elements; means drivingly connected to said motor for influencing one of said light beams; photoelectric receiver means responsive to said two light beams; a capacitor connected to said receiver means for integrating the current therein; means for discharging said capacitor after a predetermined charge value has been reached; means connected for deriving a trigger pulse from said capacitor every time it is being discharged, said trigger pulses being fed to said multivibrator for switching; and means for controlling said impedance means in response to the trigger pulse rate frequency.

12. Radiation comparison apparatus comprising: means producing alternatingly two radiation beams radiation receiver means responsive to said beams and producing corresponding electric currents; electric means connected to said receiver means for integrating said currents and producing a trigger pulse when a predetermined integrated value has been reached; means for feeding said trigger pulse to said radiation beam producing means for effecting said alternation; and means responsive to any unbalance between two succeeding time intervals as defined between two succeeding trigger pulses for controlling the intensity of one of said beams as it is effective in said receiver means.

References Cited by the Examiner

UNITED STATES PATENTS

| | | | |
|---|---|---|---|
| 2,393,631 | 1/1946 | Harrison et al. | 250—83.4 |
| 2,469,206 | 5/1949 | Rich | 250—83.4 |
| 2,594,514 | 4/1952 | Sweet | 250—205 X |
| 3,033,988 | 5/1962 | Edgerton | 250—205 |
| 3,086,170 | 4/1963 | Kemelhor et al. | 250—217 X |
| 3,128,384 | 4/1964 | Nelson et al. | 250—205 |

RALPH G. NILSON, *Primary Examiner.*

E. STRICKLAND, J. D. WALL, *Assistant Examiners.*